(12) United States Patent
Yi et al.

(10) Patent No.: US 11,836,025 B2
(45) Date of Patent: Dec. 5, 2023

(54) DEVICE AND METHOD FOR UPDATING REGISTER TRANSFER LEVEL POWER MODEL

(71) Applicant: Baum Design Systems Co., Ltd., Seoul (KR)

(72) Inventors: Joon Hwan Yi, Seoul (KR); Jonggyu Kim, Yongin-si (KR)

(73) Assignee: BAUM DESIGN SYSTEMS CO., LTD., Seoul (KR)

( * ) Notice: Subject to any disclaimer, the term of this patent is extended or adjusted under 35 U.S.C. 154(b) by 225 days.

(21) Appl. No.: 17/471,172

(22) Filed: Sep. 10, 2021

(65) Prior Publication Data

US 2022/0155839 A1   May 19, 2022

(30) Foreign Application Priority Data

Nov. 19, 2020   (KR) .......................... 10-2020-0155940

(51) Int. Cl.
*G06F 1/28* (2006.01)
*G06F 30/20* (2020.01)
*G06F 30/3308* (2020.01)
*G06F 119/06* (2020.01)

(52) U.S. Cl.
CPC ................ *G06F 1/28* (2013.01); *G06F 30/20* (2020.01); *G06F 30/3308* (2020.01); *G06F 2119/06* (2020.01)

(58) Field of Classification Search
CPC ........ G06F 1/28; G06F 2119/06; G06F 30/20; G06F 30/3308
See application file for complete search history.

(56) References Cited

U.S. PATENT DOCUMENTS

| | | | |
|---|---|---|---|
| 11,593,543 B2* | 2/2023 | Banerjee | G06F 30/337 |
| 2015/0220672 A1* | 8/2015 | Park | G06F 30/33 703/2 |
| 2017/0098023 A1* | 4/2017 | John | G06F 30/367 |

* cited by examiner

*Primary Examiner* — Terrell S Johnson
(74) *Attorney, Agent, or Firm* — Nicholas Park

(57) ABSTRACT

Provided are a device and method for updating a register transfer level (RTL) power model for power consumption analysis of a semiconductor circuit by at least one processor. The method includes receiving a test scenario including a plurality of time slots, inputting the test scenario to an initial power model and identifying a first set of time slots related to a power state which is not defined by the initial power model among the plurality of time slots, determining a power value for a specific power state related to a second set of time slots which is a subset of the first set of time slots, and updating the initial power model on the basis of the specific power state and the determined power value. Each of the plurality of time slots is related to one power state.

7 Claims, 10 Drawing Sheets

DEVICE AND METHOD FOR UPDATING REGISTER TRANSFER LEVEL POWER MODEL

CROSS-REFERENCE TO RELATED APPLICATION

This application claims priority to and the benefit of Korean Patent Application No. 10-2020-0155940, filed on Nov. 19, 2020, in the Korean Intellectual Property Office, the disclosure of which is incorporated herein by reference in its entirety.

BACKGROUND

1. Field of the Invention

The present disclosure relates to a method of updating a register transfer level (RTL) power model for analyzing power consumption of a semiconductor circuit, and more particularly, to a device and method for determining a power value for some power states in a power analysis scenario and updating an RTL power model on the basis of the power states in the power analysis scenario and the determined power value.

2. Discussion of Related Art

Power analysis is essential for low power semiconductor design, but it is difficult to perform power analysis and prediction for a wide area several times in a design stage. Existing commercial low-level (e.g., gate-level) power models can calculate power consumption according to changes of all electrical signals in a system but have a problem in that the analysis speed is very slow. On the other hand, commercial high-level (e.g., register transfer level (RTL)) power models have higher analysis speed than commercial low-level (e.g., gate-level) power models but have problems in that automatic generation is not possible and accuracy is low.

When the existing power model is of low quality with respect to a specific scenario, it is necessary to change the power model. According to the related art, a new power model is generated using both training data which was used in generating the existing power model and the specific scenario in which the power model is of low quality. In other words, when a power model is of low quality with respect to a specific scenario, it is necessary to generate a power model again using additional data, and this involves a great deal of time and high cost. Also, when a scenario in which a power model is of low quality is additionally generated, it is necessary to repeatedly generate a power model, and thus there is a problem in that a user's fatigue and burden increase.

SUMMARY OF THE INVENTION

The present disclosure is directed to providing a device and method for updating a register transfer level (RTL) power model for power consumption analysis of a semiconductor circuit and a computer program stored in a recording medium.

The present disclosure may be implemented in various ways including a method and a computer program stored in a readable storage medium.

According to an aspect of the present disclosure, there is provided a method of updating an RTL power model for power consumption analysis of a semiconductor circuit by at least one processor, the method including receiving a test scenario including a plurality of time slots, inputting the test scenario to an initial power model and identifying a first set of time slots related to a power state which is not defined by the initial power model among the plurality of time slots, determining a power value for a specific power state related to a second set of time slots which is a subset of the first set of time slots, and updating the initial power model on the basis of the specific power state and the determined power value. Here, each of the plurality of time slots is related to one power state.

The method may further include receiving a training vector including a plurality of power states and power values for the plurality of power states and generating the initial power model on the basis of the training vector.

The power value for the specific power state may be determined through a gate-level simulation of the semiconductor circuit.

The determining of the power value for the specific power state related to the second set of time slots which is the subset of the first set of time slots may include determining a power value in each of the second set of time slots through a gate-level simulation of the semiconductor circuit and determining an average of the power values in the second set of time slots as the power value for the specific power state.

When the semiconductor circuit has n (n is a natural number) major input signals, $2^n$ power states may be related to the semiconductor circuit, and the $2^n$ power states may be related to power values which differ from each other by a predetermined threshold value or more.

The inputting of the test scenario to the initial power model and the identifying of the time slot of the first set related to the power state which is not defined by the initial power model among the plurality of time slots may include identifying a specific time slot section including a predetermined ratio of time slots or more related to the power state not defined by the initial power model among the plurality of time slots and identifying the time slots related to the power state not defined by the initial power model among time slots in the specific time slot section as the first set of time slots.

The determining of the power value for the specific power state related to the second set of time slots which is the subset of the first set of time slots may include determining a power value in each of the second set of time slots by performing a gate-level simulation of the semiconductor circuit for the specific time slot section and determining an average of the power values in the second set of time slots as the power value for the specific power state.

According to another aspect of the present disclosure, there is provided a computer program stored in a computer-readable recording medium to perform a method of updating a power model in a computer.

According to another aspect of the present disclosure, there is provided a device including a memory and at least one processor connected to the memory and configured to execute at least one computer-readable program included in the memory. The at least one program includes instructions for receiving a test scenario including a plurality of time slots, inputting the test scenario to an initial power model and identifying a first set of time slots related to a power state which is not defined by the initial power model among the plurality of time slots, determining a power value for a specific power state related to a second set of time slots which is a subset of the first set of time slots, and updating the initial power model on the basis of the specific power state and the determined power value. Here, each of the plurality of time slots is related to one power state.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
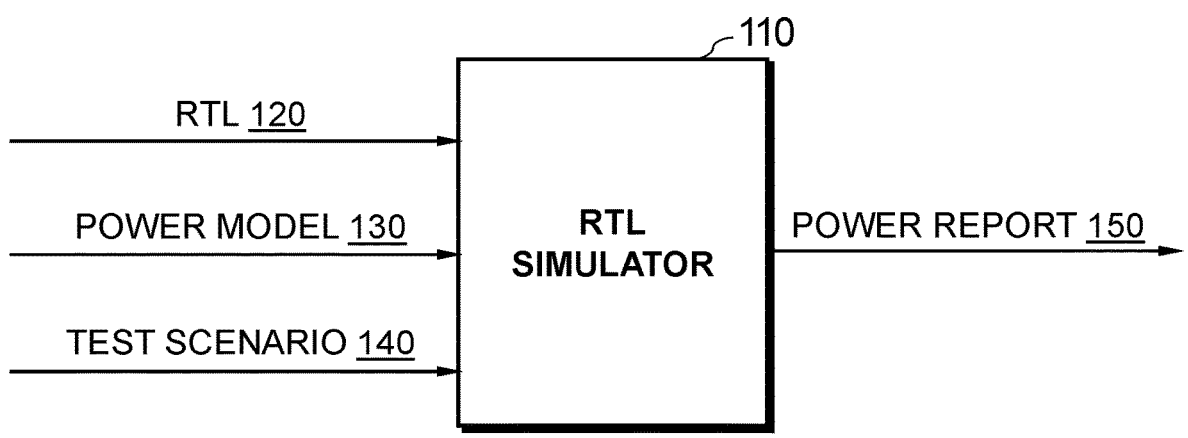
FIG. 1 is a diagram illustrating an example in which a register transfer level (RTL) simulator receives an RTL, a power model, and a test scenario and outputs a power report according to an exemplary embodiment of the present disclosure.

Hereinafter, specific embodiments of the present disclosure will be described in detail with reference to the accompanying drawings. However, in the following descriptions, when a detailed description of a well-known function or configuration may obscure the gist of the present disclosure, the detailed description will be omitted.

In the accompanying drawings, like elements are indicated by like reference numerals. In the following description of embodiments, repeated descriptions of identical or corresponding elements may be omitted. However, even when a description of an element is omitted, such an element is not intended to be excluded from an embodiment.

Terms used herein will be briefly described, and then exemplary embodiments will be described in detail. The terms used herein are selected as general terms which are widely used at present in consideration of functions in the present disclosure but may be altered according to the intent of an engineer skilled in the art, precedents, introduction of new technology, or the like. In addition, specific terms are arbitrarily selected by the applicant, and in this case, their meanings will be explained in detail in the corresponding description of the present disclosure. Therefore, the terms used herein should be defined on the basis of their meanings and the overall content of the present disclosure instead of simply the names of the terms.

As used herein, the singular forms include the plural forms unless context clearly indicates otherwise. Also, the plural forms include the singular forms unless context clearly indicates otherwise.

When one part is referred to as including an element, this means that the part does not exclude other elements and may include other elements unless specifically described otherwise.

Advantages and features of the disclosed embodiments and implementation methods thereof will be clarified through the following embodiments described with reference to the accompanying drawings. However, the present disclosure may be embodied in different forms and should not be construed as limited to the embodiments set forth herein. Rather, these embodiments are provided so that this disclosure will be thorough and complete and will fully convey the scope of the present disclosure to those of ordinary skill in the art.

In the present specification, a "power state for which power value is defined" and/or a "power state defined by a power model" may refer to a power state included in data (e.g., a training scenario, a training vector, or an update vector) used in generating and/or updating a power model. For example, a "power state for which a power value is defined" and/or a "power state defined by a power model" may include a power state for which a power value is calculated or determined through a gate-level simulation.

In the present specification, an "undefined power state" may refer to a power state which is not included in data (e.g., a training scenario or a training vector) used in generating and/or updating a power model. For example, an "undefined power state" may be an uncharacterized power state (UPS). Here, a power value for an "undefined power state" may be predicted or estimated on the basis of another power state and a power value for the other power state.

In the present specification, a "scenario" may include data or information which reflects various environments and/or input values of a power model. The data or information included in the scenario may vary over time, and the scenario may include a plurality of time slots related to such data or information. For example, when a scenario is input to a power model, input signal values corresponding to time slots may be input to the power model in order of time slots included in the scenario. A training scenario may include data (e.g., a power state and a power value) for generating a power model. A power analysis scenario and/or a test scenario may include data for analyzing a power model. A power analysis scenario and/or a test scenario may be hundreds to thousands of times longer than a training scenario.

In the present specification, a "time slot" may refer to a cycle of a clock signal for a digital circuit (e.g., a power model). Here, each time slot may represent a time section having the same length. For example, one time slot included in a scenario may correspond to one cycle of a clock signal. In this case, the length of a time section represented by one time slot may correspond to a clock period. Alternatively, one time slot included in a scenario may correspond to n cycles of a clock signal. In this case, the length of a time section represented by one time slot may correspond to n times the clock period. Each time slot included in a scenario may be related to one input signal value and/or one power state.

FIG. 1 is a diagram illustrating an example in which a register transfer level (RTL) simulator 110 receives an RTL 120, a power model 130, and a test scenario 140 and outputs a power report 150 according to an exemplary embodiment of the present disclosure. Low-power semiconductor design involves power consumption analysis based on a power model. Here, the power model 130 may be configured to predict or estimate a power value according to a power state determined on the basis of a major input signal of a target circuit. The complexity of the power model 130 may exponentially increase with an increase in the size of the target circuit. To reduce the complexity of the power model 130, the power model 130 may be configured using only about 1% of all input signals to the target circuit with millions of gates. However, when there are n major input signals, the number of power states is $2^n$. Accordingly, even when about 1% of all input signals are used as major input signals (e.g., thousands or tens of thousands of major input signals), there are a very large number of power states. Therefore, in the case of generating the power model 130, it may be difficult to define power values for all power states through a gate-level simulation in terms of time and cost. To solve this problem, power values may be defined for only some of a plurality of power states, and power values may be estimated for the other power states. For example, when a power value is not defined for a power state, an approximate value calculated through numerical analysis and the like may replace the power value.

In the case of analyzing power consumption using the power model 130, there may be a variety of scenarios. Since an estimated power value is used for a power state for which a power value is not defined, the reliability of power analysis results of the power model 130 may be degraded with respect to a scenario including many power states for which power values are not defined. Because of semiconductor design characteristics, when the reliability of power analysis results is not ensured at a certain level or higher, it is difficult to commercialize the semiconductor design. Therefore, to improve the reliability of such power analysis results, it is necessary to measure the quality of the power model 130 and improve the quality of the power model 130 according to the measurement result.

When the quality of the power model 130 for a specific scenario is low, the power model 130 may be regenerated using a training scenario (or a training vector) used in generating the existing power model 130 and the whole scenario in which the quality of the power model 130 is low. Since low-level (e.g., gate-level) information is used in power modeling, a great deal of time and high cost may be required for regenerating or updating the power model. Also, when a scenario in which the quality of the power model 130 is low is additionally generated, it is necessary to repeatedly regenerate or alter the power model 130. In this process, a user's fatigue or burden may increase. To solve this problem, the power model 130 is updated using only a part of the scenario in which the quality of the power model 130 is low so that the quality of the power model 130 can be efficiently improved. In other words, when the power model 130 is updated using a part of a scenario in which the quality of the power model 130 is low, the quality improvement speed and accuracy of the power model 130 can be improved, and the usability of the power model 130 can be improved.

To this end, the RTL simulator 110 of FIG. 1 may receive the RTL 120, the power model 130, and the test scenario 140 and generate and output the power report 150 including power consumption information of the power model 130 for the test scenario 140. Here, the RTL 120 may include a circuit blueprint for which power consumption will be analyzed using the power model 130. Also, the test scenario 140 may include a plurality of time slots, each of which may be related to one power state. A power state related to each of the plurality of time slots may be a power state for which a power value is defined by the power model 130 or a power state for which a power value is not defined. In the exemplary embodiment, the RTL simulator 110 may estimate power consumption of the power model 130 for the test scenario 140 by inputting the test scenario 140 to the received power model 130 and output the power report 150 including the estimated power consumption. Here, the power report 150 may include the waveform of power consumption, an average power consumption value, power consumption information over time, etc. for the test scenario 140.

In the exemplary embodiment, the RTL simulator 110 may identify a time slot which is related to a power state not defined by the power model 130 among the plurality of time slots in the test scenario 140 using the RTL 120, the power model 130, and the test scenario 140. Subsequently, the RTL simulator 110 may measure the quality of the power model 130 for the received test scenario 140 and output the power report 150 including information on the measured quality and/or information for improving the quality. For example, the RTL simulator 110 may measure the quality of the test scenario 140 by calculating a hit rate and/or a miss rate of the power model 130 for the test scenario 140. Here, the hit rate of the power model 130 for the test scenario 140 may be determined according to the following equation.

$$\text{Accuracy rate} = \frac{\text{Number of time slots related to power states defined by power model}}{\text{Total number of time slots}}$$

In addition, the RTL simulator 110 may determine whether to upgrade the power model 130 according to the measured quality of the power model 130 and select some or all of time slots which are related to power states not defined by the power model 130. For example, when the hit ratio of the power model 130 for the test scenario 140 is a predetermined threshold value (e.g., 80%) or less, the RTL simulator 110 may determine that it is necessary to upgrade the power model 130.

In an exemplary embodiment, the power report 150 output from the RTL simulator 110 may include information on the time slots which are related to the power states not defined by the power model 130 among the plurality of time slots, the quality of the power model 130, whether it is necessary to upgrade the power model 130, and the like.

Figure 2:
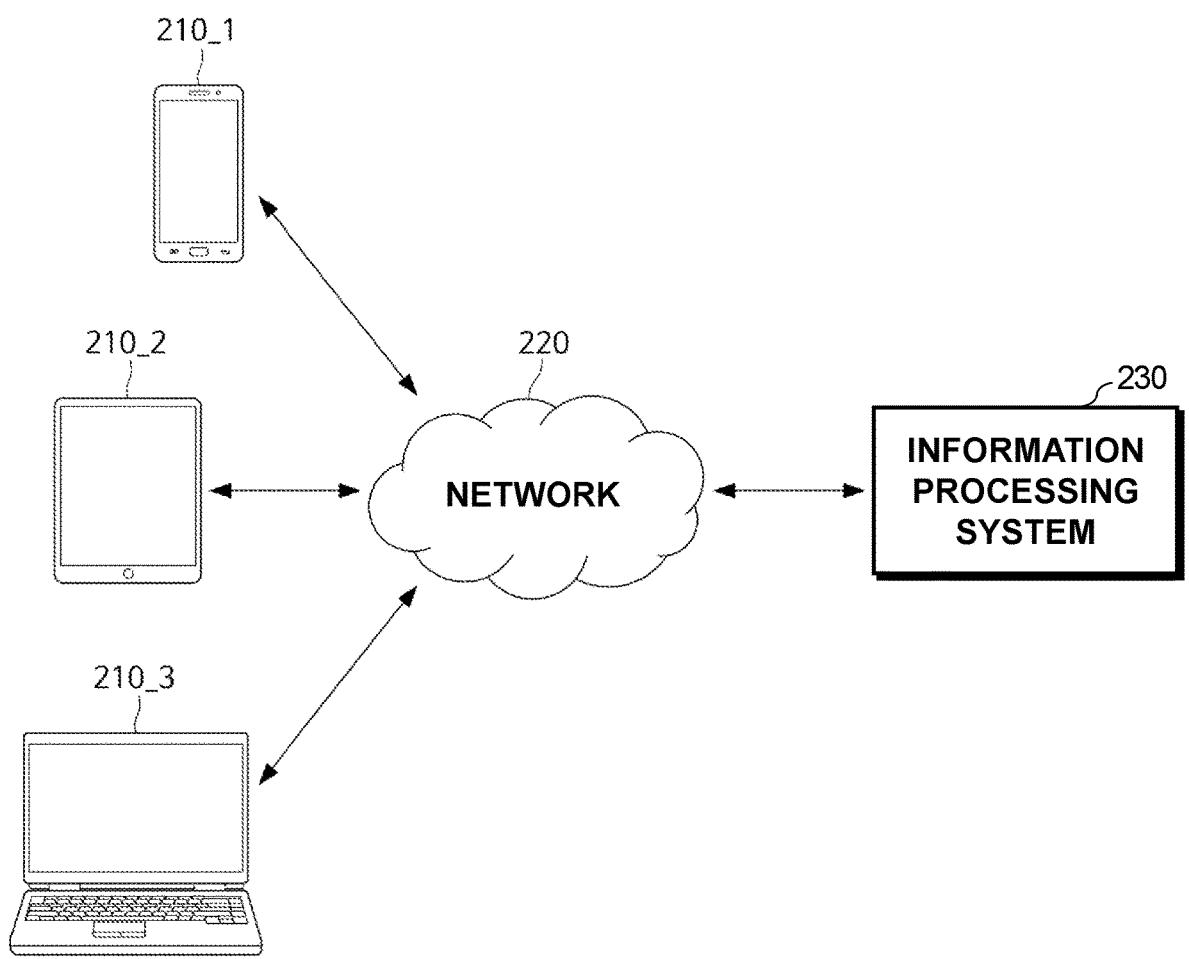
FIG. 2 is a schematic diagram illustrating a configuration in which an information processing system is communicably connected to a plurality of user terminals to generate and update a power model according to an exemplary embodiment of the present disclosure.

FIG. 2 is a schematic diagram illustrating a configuration in which an information processing system 230 is communicably connected to a plurality of user terminals 210_1, 210_2, and 210_3 to generate and update a power model according to an exemplary embodiment of the present disclosure. The information processing system 230 may include a system(s) for generating and updating a power model. In the exemplary embodiment, the information processing system 230 may include one or more server devices and/or databases or one or more cloud computing service-based distributed computing devices and/or distributed databases which may store, provide, and execute computer-executable programs (e.g., a downloadable application) and data related to a power model update. For example, the information processing system 230 may include a separate system (e.g., a server) for generating and updating a power model.

Power model generation and update performed by the information processing system 230 may be provided to a user through a power model update application and the like installed in each of the plurality of user terminals 210_1, 210_2, and 210_3. Alternatively, the user terminals 210_1, 210_2, and 210_3 may perform tasks, such as initial power model generation, time slot identification, power value determination, and power model update, using a power model generation and update program or algorithm stored therein. In this case, the user terminals 210_1, 210_2, and 210_3 may perform tasks, such as initial power model generation, time slot identification, power value determination, and power model update, without communicating with the information processing system 230.

The plurality of user terminals 210_1, 210_2, and 210_3 may communicate with the information processing system 230 through a network 220. The network 220 may be configured to allow communication between the plurality of user terminals 210_1, 210_2, and 210_3 and the information processing system 230. The network 220 may be configured as a wireless network, such as Ethernet, a power line communication network, a telephone line communication network, and a recommendation system (RS) serial communication network, a wireless network, such as a mobile communication network, a wireless local area network (WLAN), Wi-Fi, Bluetooth, and ZigBee, or a combination thereof. There is no limitation on the communication method, which may include not only a communication method employing a communication network (e.g., a mobile communication network, a wireless Internet, a wired Internet, a broadcasting network, and a satellite network) which may be included in the network 220 but also short-range wireless communication between the user terminals 210_1, 210_2, and 210_3.

As examples of user terminals, the cellular phone terminal 210_1, the tablet terminal 210_2, and the personal computer (PC) terminal 210_3 are shown in FIG. 2. However, the user terminals 210_1, 210_2, and 210_3 are not limited thereto and may be any computing device which may perform wired and/or wireless communication. For example, user terminals may include a smart phone, a cellular phone, a computer, a laptop PC, a personal digital assistant (PDA), a portable multimedia player (PMP), a tablet PC, and the like. Although FIG. 2 shows that the three user terminals 210_1, 210_2, and 210_3 communicate with the information processing system 230 through the network 220, the present disclosure is not limited thereto, and a different number of user terminals may communicate with the information processing system 230 through the network 220.

According to the exemplary embodiment, the information processing system 230 may receive data (e.g., a training vector, a test scenario, and an RTL) from the user terminals 210_1, 210_2, and 210_3 through a power model generation and update application or the like which runs on the user terminals 210_1, 210_2, and 210_3. The information processing system 230 may generate an initial power model on the basis of the received data and transmit the generated initial power model to the user terminals 210_1, 210_2, and 210_3. Alternatively or additionally, the information processing system 230 may update the initial power model on the basis of the received data and transmit the updated power model to the user terminals 210_1, 210_2, and 210_3. Alternatively, power model generation and update tasks may not be performed in the information processing system 230 and both may be performed in the user terminals 210_1, 210_2, and 210_3.

Figure 3:
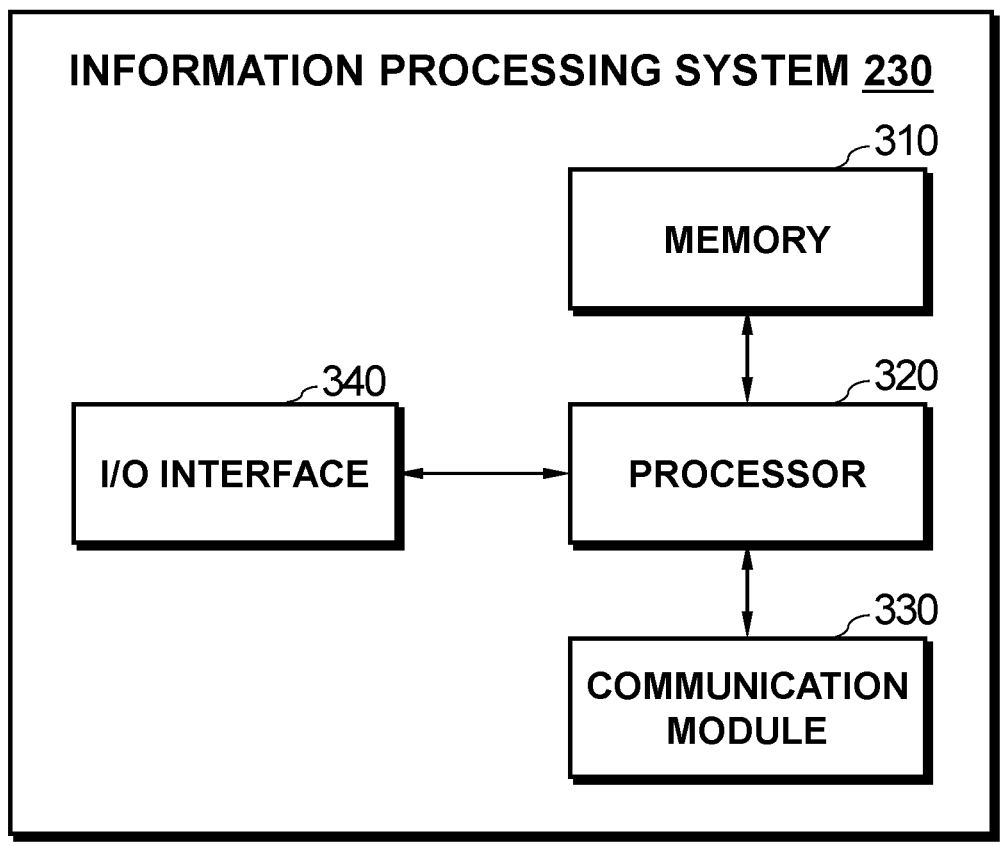
FIG. 3 is a block diagram illustrating an internal configuration of the information processing system according to the exemplary embodiment of the present disclosure.

FIG. 3 is a block diagram illustrating an internal configuration of the information processing system 230 according to the exemplary embodiment of the present disclosure. The information processing system 230 may include a memory 310, a processor 320, a communication module 330, and an input/output interface 340. As shown in FIG. 3, the information processing system 230 may be configured to communicate information and/or data through a network using the communication module 330.

The memory 310 may include any non-transitory computer-readable recording medium. According to the exemplary embodiment, the memory 310 may include a permanent mass storage device such as a random access memory (RAM), a read only memory (ROM), a disk drive, a solid state drive (SSD), and a flash memory. As another example, a permanent mass storage device, such as a ROM, an SSD, a flash memory, and a disk drive, may be included in the information processing system 230 as a permanent storage device separate from the memory 310. Also, the memory 310 may store an operating system and at least one piece of program code (e.g., code for a power model update application, a power value determination program, an initial power model generation program, a power model update program, etc. which are installed and run on the information processing system 230).

Such software elements may be loaded from a computer-readable recording medium separate from the memory 310. Such a separate computer-readable recording medium may include a recording medium which may be directly connected to the information processing system 230, for example, a floppy drive, a disk, tape, a digital versatile disk (DVD)/compact disc (CD)-ROM drive, and a memory card. As another example, software elements may be loaded to the memory 310 through the communication module 330 rather than a computer-readable recording medium. For example, at least one program may be loaded to the memory 310 on the basis of a computer program (e.g., the power model update application, the power value determination program, the initial power model generation program, and the power model update program) installed with files which are provided through the communication module 330 by developers or a file distribution system for distributing application installation files.

The processor 320 may be configured to process commands of a computer program by performing basic arithmetic, logic, and input/output operations. The commands may be provided to the processor 320 by the memory 310 or the communication module 330. For example, the processor 320 may be configured to execute received commands according to the program code stored in a recording device such as the memory 310.

The communication module 330 may provide a configuration or function for a user terminal (not shown) and the information processing system 230 to communicate with each other through a network and may provide a configuration or function for the information processing system 230 to communicate with another system (e.g., a separate cloud system) through a network. As an example, a control signal, command, data, etc. provided according to control of the processor 320 of the information processing system 230 may pass through the communication module 330 and a network and then may be received by the user terminal through a communication module of the user terminal. For example, the user terminal may receive a generated initial power model, an updated power model, a power report, etc. from the information processing system 230.

The input/output interface 340 of the information processing system 230 may be a device for interfacing with an input or output device (not shown) which may be connected to the information processing system 230 or included in the information processing system 230. Although the input/output interface 340 is shown as a separate element from the processor 320 in FIG. 3, the present disclosure is not limited thereto, and the input/output interface 340 may be included in the processor 320. The information processing system 230 may include more elements than those of FIG. 3. However, it is unnecessary to clearly show most elements of the related art.

The processor 320 of the information processing system 230 may be configured to manage, process, and/or store information and/or data received from a plurality of user terminals and/or a plurality of external systems. In the exemplary embodiment, the processor 320 may store, process, and transmit a training vector, a test scenario, etc. which are received from the user terminal. For example, the processor 320 may generate an initial power model on the basis of the training vector which is received from the user terminal. In addition, the processor 320 may identify a first set of time slots related to a power state which is not defined by the initial power model among a plurality of time slots included in the received test scenario, determine a power value for a specific power state related to a second set of time slots which is a subset of the first set of time slots, and update the initial power model on the basis of the specific power state and the determined power value.

Figure 4:
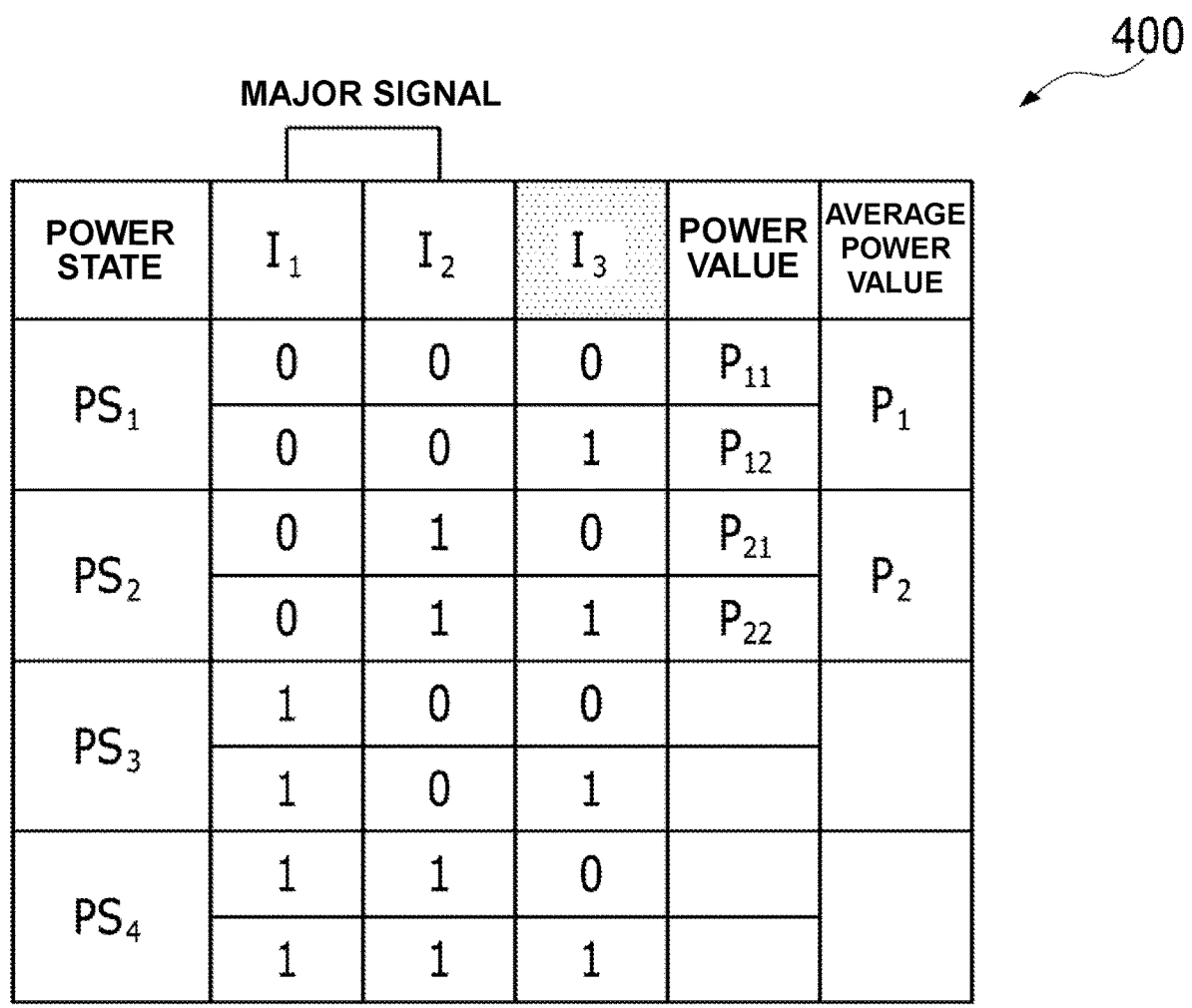
FIG. 4 is a diagram illustrating an example of determining a power state of a target circuit having three input signals ($I_1$, $I_2$, and $I_3$) and a power value for the power state according to the exemplary embodiment of the present disclosure.

FIG. 4 is a diagram illustrating an example of determining a power state of a target circuit having three input signals $I_1$, $I_2$, and $I_3$ and a power value for the power state according to the exemplary embodiment of the present disclosure. A processor may determine some of numerous input signals of the target circuit as input signals for configuring a power model. According to the number of input signals for configuring a power model, the number of power states related to the target circuit may be determined. When the number of input signals for configuring the power model is n (n is a natural number), there may be $2^n$ power states related to the target circuit. In other words, when the number of input signals for configuring the power model increases, the number of power states related to the target circuit exponentially increases, and thus the quality of the power model may be improved. However, a great deal of time and high cost may be required for power model generation and power analysis. Therefore, the processor may determine major input signals which may ensure the accuracy of power analysis while maintaining efficiency in power analysis as input signals for configuring the power model among the input signals of the target circuit. For example, the processor may determine major input signals (or sensitive signals) which greatly affect the power consumption of the target circuit as input signals for configuring the power model among the input signals of the target circuit. When n major input signals which greatly affect the power consumption of a semiconductor circuit correspond to input signals for configuring a power model among m input signals of the semiconductor circuit, the power model may have $2^n$ power states, which may be related to power values which differ from each other by a predetermined threshold value or more.

For example, a table 400 is an example of a case in which a target circuit includes three input signals $I_1$, $I_2$, and $I_3$, and $I_1$ and $I_2$ are input signals for configuring a power model as major input signals. In this case, when values input to the target circuit as $I_1$ or $I_2$ are changed, there is a difference of a predetermined threshold value or more in a power value consumed by the circuit. On the other hand, when the different input signals $I_1$ and $I_2$ are not changed, there is no difference of the predetermined threshold value or more in the power value consumed by the circuit regardless of whether an input value for $I_3$ is changed. In the illustrated example, there are two major input signals, and thus the number of power states related to the target circuit may be $2^2$ ($PS_1$, $PS_2$, $PS_3$, and $PS_4$). In this case, major input signal values are the same as (0, 0) between input signal values ($I_1=0$, $I_2=0$, $I_3=0$) and (0, 0, 1), and thus the input signal values ($I_1=0$, $I_2=0$, $I_3=0$) and (0, 0, 1) correspond to the same power state $PS_1$. Major input signal values are the same as (0, 1) between input signal values ($I_1=0$, $I_2=1$, $I_3=0$) and (0, 1, 1), and thus the input signal values ($I_1=0$, $I_2=1$, $I_3=0$) and (0, 1, 1) correspond to the same power state $PS_2$. Major input signal values are the same as (1, 0) between input signal values ($I_1=1$, $I_2=0$, $I_3=0$) and (1, 0, 1), and thus the input signal values ($I_1=1$, $I_2=0$, $I_3=0$) and (1, 0, 1) correspond to the same power state $PS_3$. Major input signal values are the same as (1, 1) between input signal values ($I_1=1$, $I_2=1$, $I_3=0$) and (1, 1, 1), and thus the input signal values ($I_1=1$, $I_2=1$, $I_3=0$) and (1, 1, 1) correspond to the same power state $PS_4$ In general, since numerous power states are included in a power model, it is difficult to calculate power values for all the power states in power modeling. Accordingly, the processor may calculate power values for some of the plurality of power states for the purpose of power modeling. In the exemplary embodiment, power value for some of the plurality of power states may be determined through a gate-level simulation. For example, the processor may input input signal values corresponding to a specific power state to a gate-level simulation and determine an average of output power values as a power value for the specific power state. The power state for which a power value is determined (i.e., a power state for which a power value is defined) and the power value may constitute a training vector used in generating an initial power model. Also, a power value for a power state for which a power value is not determined (i.e., a power state for which a power value is not defined) may be predicted or estimated on the basis of another power state and a power value for the other power state. For example, the processor may replace a power value for a power state for which a power value is not defined with an approximate value calculated through numerical analysis and the like.

As shown in the table 400, the processor may determine $PS_1$ and $PS_2$, which are some of power states included in a power model, through a simulation. Specifically, through a gate-level simulation, the processor may determine $P_{11}$ as a power value for the input signal values (0, 0, 0) corresponding to the power state $PS_1$ and determine $P_{12}$ as a power value for the input signal values (0, 0, 1) corresponding to the power state $PS_1$. In this case, the processor may determine $P_1$, which is an average of $P_{11}$ and $P_{12}$, as a power value for the power state $PS_1$.

Also, through a gate-level simulation, the processor may determine $P_{21}$ as a power value for the input signal values (0, 1, 0) corresponding to the power state $PS_2$ and determine $P_{22}$ as a power value for the input signal values (0, 1, 1) corresponding to the power state $PS_2$. In this case, the processor may determine $P_2$, which is an average of $P_{21}$ and $P_{22}$, as a power value for the power state $PS_2$. Subsequently, the processor may generate a power model using a training vector including pairs of $PS_1$-$P_1$ and $PS_2$-$P_2$.

Additionally, the processor may estimate power values for the others $PS_3$ and $PS_4$ to be $P_3'$ and $P_4'$ using the generated power model. Since the values of $P_3'$ and $P_4'$ are inaccurate compared to $P_1$ and $P_2$, the reliability and quality of the power model may be degraded.

For convenience of description, FIG. 4 shows an example in which there are three input signals of the target circuit and two major input signals, but the present disclosure is not limited thereto. For example, there may be millions of input signals of the target circuit and thousands to tens of thousands of major input signals. The power states of the target circuit and the power values for the power states shown in FIG. 4 may be applied to FIGS. 5 to 7.

Figure 5:
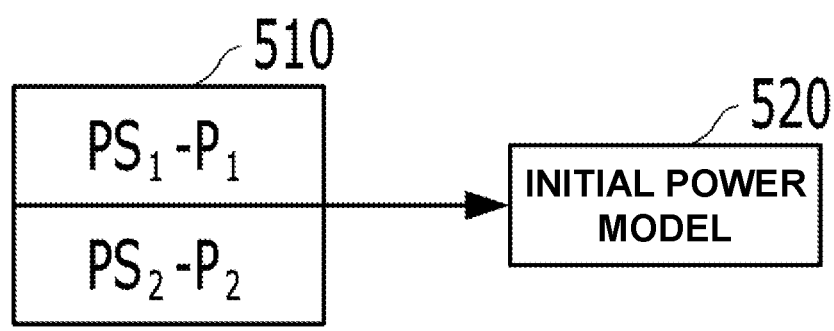
FIG. 5 is a diagram illustrating an example of generating an initial power model on the basis of a training vector according to the exemplary embodiment of the present disclosure.

FIG. 5 is a diagram illustrating an example of generating an initial power model 520 on the basis of a training vector 510 according to the exemplary embodiment of the present disclosure. As described above, since it is generally difficult to define power values for all power states through in power modeling, a processor may define power values for some of the power states in advance through a simulation to generate the initial power model 520. The processor may generate the initial power model 520 using power states for which power values are defined and the power values.

In the exemplary embodiment, the processor may receive the training vector 510 including a plurality of power states and power values for the plurality of power states and generate the initial power model 520 on the basis of the received training vector 510. Here, the plurality of power states included in the training vector 510 may correspond to some of the power states of a power model. Also, the power values for the plurality of power states may be determined through a gate-level simulation. Alternatively, the processor may receive one or more training scenarios and generate the initial power model 520 on the basis of the received one or more training scenarios. Here, the training scenarios may include a plurality of time slots related to power states for which power values are defined. The training scenarios may be shorter than a test scenario used in power model analysis and/or quality evaluation.

As shown in the drawing, the processor may receive the training vector 510 including power states $PS_1$ and $PS_2$ and power values $P_1$ and $P_2$ for each of the power states and generate the initial power model 520. For convenience of description, the training vector 510 includes two power states and power values corresponding to the power states in FIG. 5, but the number of power states and the number of power values are not limited thereto. For example, the training vector 510 may include pairs of a power state and a power value which correspond to a predetermined ratio with respect to all the power states.

Figure 6:
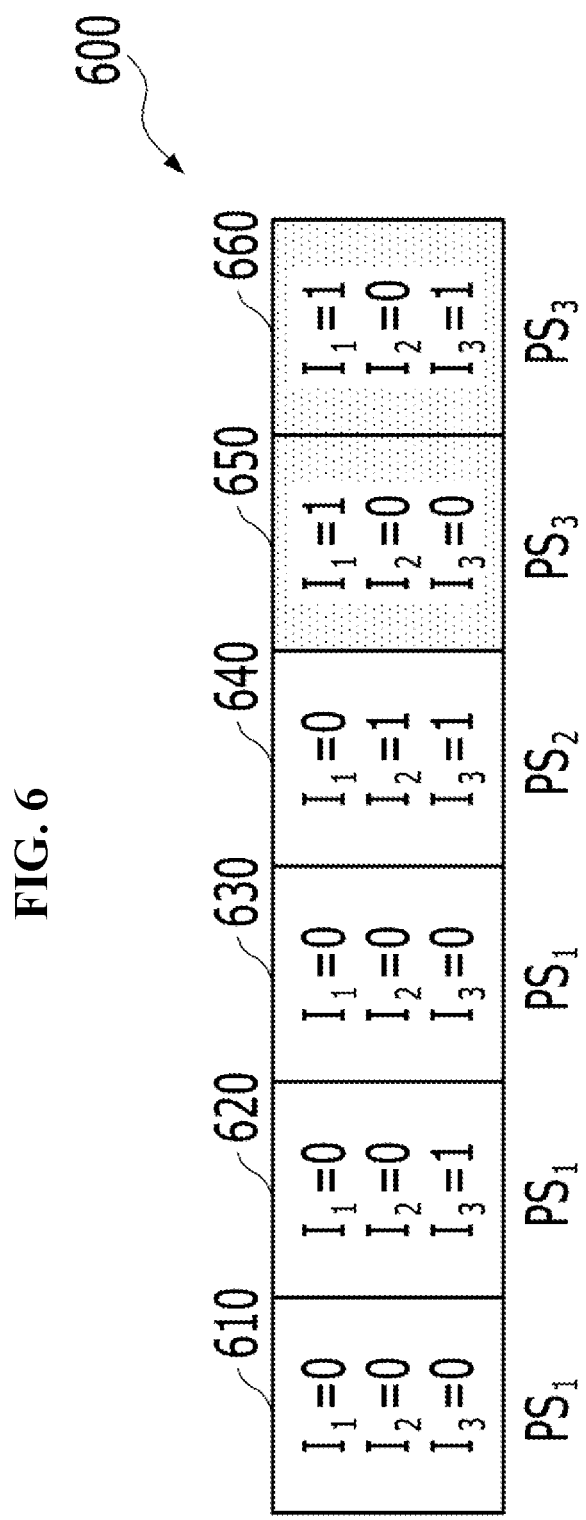
FIG. 6 is a diagram illustrating an example of identifying time slots related to power states which are not defined by an initial power model in a test scenario according to the exemplary embodiment of the present disclosure.

FIG. 6 is a diagram illustrating an example of identifying time slots 650 and 660 related to power states which are not defined by an initial power model in a test scenario 600 according to the exemplary embodiment of the present disclosure. In the exemplary embodiment, a processor may receive the test scenario 600 including a plurality of time slots 610, 620, 630, 640, 650, and 660. Here, the plurality of time slots (or cycles) may be related to power states on a one-to-one basis and may have the same length of time. The processor may identify the time slots 650 and 660 related to power states which are not defined by the initial power model among the plurality of time slots 610, 620, 630, 640, 650, and 660 in the received test scenario 600 using the initial power model.

The processor may measure the quality of the initial power model for the test scenario 600. For example, the processor may calculate a ratio of power states having power values defined by the initial power model to a power analysis time, that is, a ratio of the time slots 610, 620, 630, and 640 related to characterized power states defined by the initial power model to the plurality of time slots 610, 620, 630, 640, 650, and 660 (i.e., the hit ratio of the power model). On the other hand, the processor may calculate a ratio of uncharacterized power states for which it is necessary to estimate power values using the initial power model to the power analysis time, that is, a ratio of the time slots 650 and 660 related to power states not defined by the initial power model to the plurality of time slots 610, 620, 630, 640, 650, and 660 (i.e., the miss ratio of the power model). In this case, a power model which has a high hit ratio and a low miss ratio may correspond to a power model with high quality. When the calculate quality of the power model, that is, the hit ratio of the power model, is lower than a predetermined reference (e.g., 80%), the processor may determine to regenerate and/or update a power model.

For example, the processor may receive the test scenario including the six time slots 610, 620, 630, 640, 650, and 660 and predict or estimate power consumption according to the test scenario 600 using the power model. In this case, the processor may identify the fifth time slot 650 and the sixth time slot 660 related to a power state $PS_3$ which is not defined by the power model among the plurality of time slots 610, 620, 630, 640, 650, and 660. Here, the hit ratio of the power model may be calculated to be about 66%. Since the hit ratio of the power model is less than 80%, the processor may determine to update the power model.

The processor may identify the first set of time slots 650 and 660 related to the power state, which is not defined by the initial power model, to update the power model. Subsequently, the processor may determine a power value for a specific power state related to time slots of a second set which is a subset of the first set of time slots. Here, the second set of time slots may be all or a part of time slots related to the same power state among the first set of time slots. For example, when the first set of time slots identified by the processor includes a plurality of time slots related to the power state $PS_3$ and a plurality of time slots related to a power state $PS_4$, the second set of time slots may be the plurality of time slots related to the power state $PS_3$ or the plurality of time slots related to the power state $PS_4$.

The power value for the specific power state related to the second set of time slots may be determined through a gate-level simulation of a semiconductor circuit. In the exemplary embodiment, power values for the second set of time slots may be determined, and an average of the determined power values may be determined as a power value for the specific power state. For example, through a gate-level simulation, the processor may determine a power value $P_{31}$ with input signal values (1, 0, 0) of the fifth time slot 650 related to the power state $PS_3$ and a power value $P_{32}$ with input signal values (1, 0, 1) of the sixth time slot 660 related to the power state $PS_3$ and determine a power value for the power state $PS_3$ to be $P_3$ which is an average of $P_{31}$ and $P_{32}$.

In the exemplary embodiment, the processor may identify a specific time slot section (e.g., 650 and 660) including a predetermined ratio (e.g., 40%) or more of time slots related to the power states (e.g., $PS_3$ and $PS_4$) which are not defined by the power model in the test scenario 600 including the plurality of time slots and identify time slots related to a power state which is not defined by the power model among time slots in the specific time slot section as a first set of time slots (e.g., 650 and 660). For example, in the test scenario 600, a specific time slot section in which a relatively large number of time slots related to a power state for which a power value is not defined are present (or concentrated) may be identified, and the time slots included in the section and related to the power state for which a power value is not defined may be identified as a first set of time slots. Subsequently, the processor may perform a gate-level simulation of the semiconductor circuit for the specific time slot section to determine power values (e.g., $P_{31}$ and $P_{32}$) for each of the second set of time slots (e.g., 650 and 660), which is the subset of the first set of time slots, and determine an average (e.g., $P_3$) of the power values of each of the second set of time slots as a power value for a specific power state (e.g., $PS_3$). For example, the second set may have 10 time slots, and an average of 10 power values may be determined as the power value for the specific power state.

FIG. 6 shows that the six time slots 610 to 660 are included in the test scenario 600, but the number of time slots included in a test scenario is not limited thereto. For example, a test scenario may include many more time slots and may generally be much longer than a training scenario.

Figure 7:
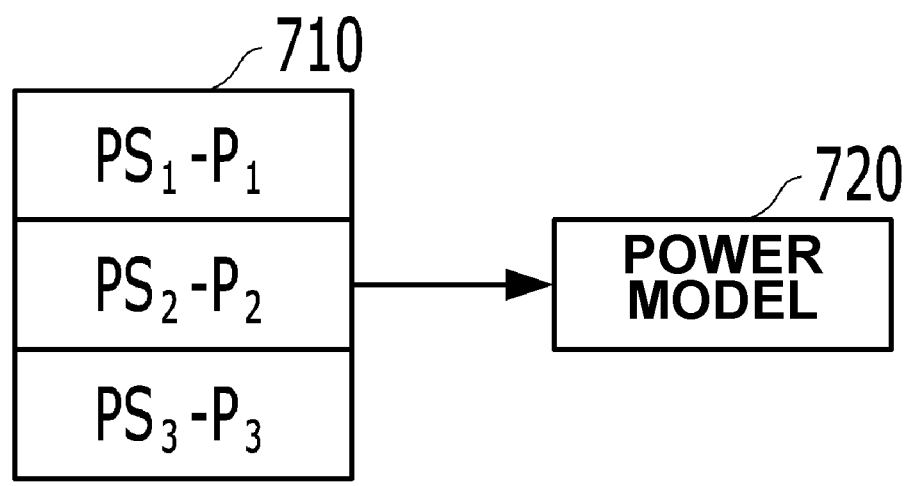
FIG. 7 is a diagram illustrating an example of updating a power model according to the exemplary embodiment of the present disclosure.

FIG. 7 is a diagram illustrating an example of updating a power model 720 according to the exemplary embodiment of the present disclosure. As described above, a processor may determine power values for specific power states related to some of a plurality of time slots included in a test scenario. Subsequently, the processor may update an initial power model on the basis of the specific power states and the determined power values. In the exemplary embodiment, the processor may update the initial power model on the basis of an update vector 710 including the specific power states and the determined power values. Here, the update vector 710 may include a training vector used in generating the initial power model.

As shown in the drawing, the processor may update the initial power model on the basis of power states and power values (i.e., power states $PS_1$ and $PS_2$ defined by the initial power model and power values $P_1$ and $P_2$ for the power states) included in the training vector and a specific power state $PS_3$ not defined by the initial power model and a determined power value $P_3$. The updated power model uses a more accurate power value for the power state $PS_3$ than the initial power model, and thus the quality of the power model for a scenario including a time slot related to the power state $PS_3$ can be improved.

Figure 8:
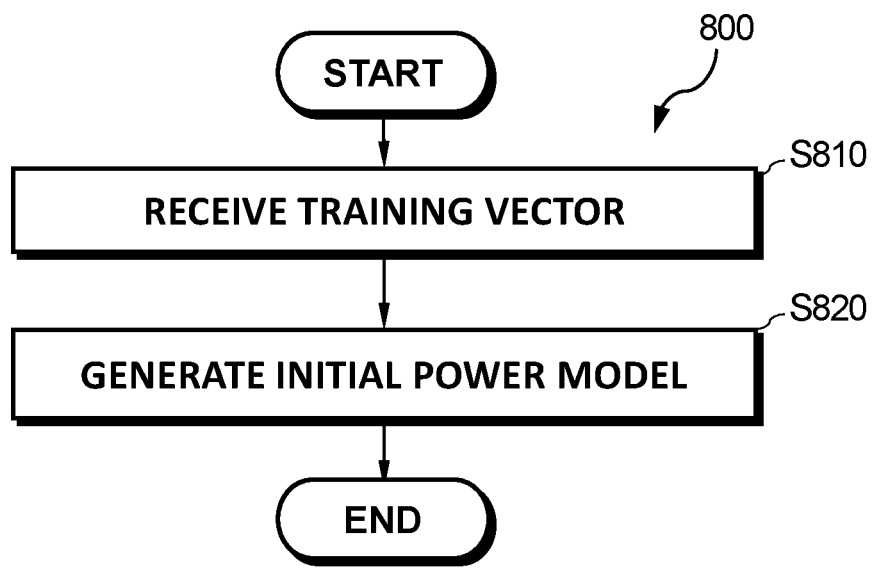
FIG. 8 is a flowchart illustrating a method of generating an initial power model according to an exemplary embodiment of the present disclosure.

FIG. 8 is a flowchart illustrating a method 800 of generating an initial power model according to an exemplary embodiment of the present disclosure. In the exemplary embodiment, the method 800 of generating an initial power model may be performed by a processor (e.g., at least one processor of an information processing system). As shown in the drawing, the method 800 of generating an initial power model may be started when the processor receives a training vector (S810). Here, the training vector may include a plurality of power states and power values for the plurality of power states, and the plurality of power states included in the training vector may correspond to some power states of a power model. Also, the power values for the plurality of power states may be determined through a gate-level simulation. Subsequently, the processor may generate an initial power model on the basis of the received training vector (S820).

Figure 9:
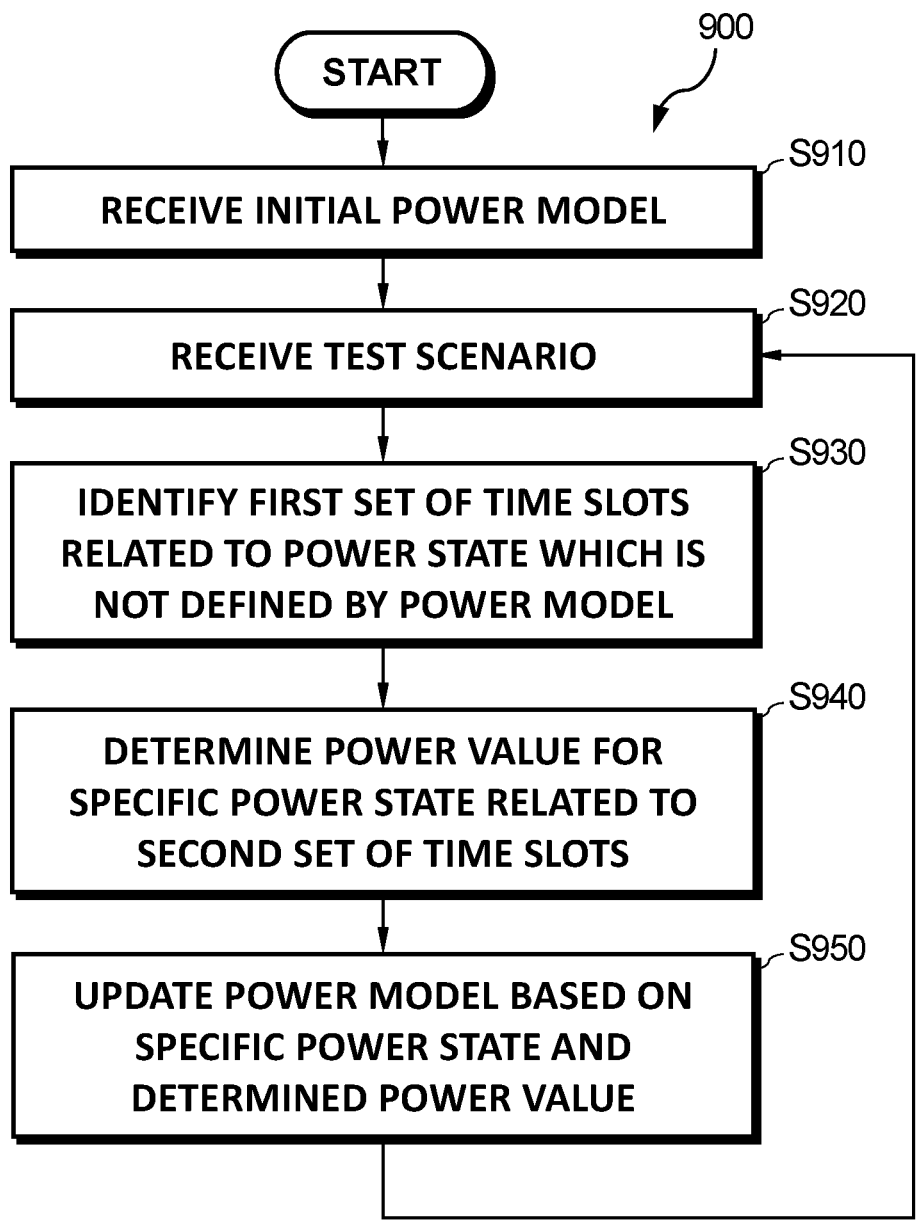
FIG. 9 is a flowchart illustrating a method of updating a power model according to an exemplary embodiment of the present disclosure.

FIG. 9 is a flowchart illustrating a method 900 of updating a power model according to an exemplary embodiment of the present disclosure. In the exemplary embodiment, the method 900 of updating a power model may be performed by a processor (e.g., at least one processor of an information processing system). As shown in the drawing, the method 900 of updating a power model may be started when the processor receives an initial power model (S910). Here, the initial power model may be generated according to the above-described method of generating an initial power model (800 of FIG. 8). Alternatively, the initial power model may be received from another system or device. The processor may receive a test scenario including a plurality of time slots (S920). Here, the plurality of time slots may be related to power states on a one-to-one basis.

Subsequently, the processor may identify a first set of time slots related to a power state which is not defined by a power model among the plurality of time slots included in the test scenario using the power model (S930). Here, the power model may be the initial power model received in operation S910. Alternatively, the power model may be a power model updated in operation S950 performed before operation S920. In the exemplary embodiment, the processor may identify a specific time slot section including a predetermined ratio of time slots or more related to the power state not defined by the power model (e.g., the initial power model) among the plurality of time slots and identify time slots related to the power state not defined by the power model (i.e., the initial power model) among time slots in the identified specific time slot section as the first set of time slots.

Subsequently, the processor may determine a power value for a specific power state related to a second set of time slots which is a subset of the first set of time slots (S940). In the exemplary embodiment, the power value for the specific power state may be determined through a gate-level simulation of a semiconductor circuit. In the exemplary embodiment, the processor may determine power values of each of the second set of time slots and determine an average of the power values of each of the second set of time slots to be a power value for the specific power sates. In the exemplary embodiment, the processor may perform a gate-level simulation of the semiconductor circuit for the specific time slot section to determine power values for the second set of time slots and determine an average of the power values of each of the second set of time slots as the power value for the specific power state.

Subsequently, the processor may update the power model on the basis of the specific power state and the determined power value (S950). Here, the power model may be the initial power model received in operation S910. Alternatively, the power model may be the power model updated in operation 950 before operation S920. Subsequently, the processor may gradually train or update the power model by repeatedly performing operations S920 to S950. In the exemplary embodiment, when the semiconductor circuit includes n (n is a natural number) major input signals, $2^n$ power states may be related to the semiconductor circuit, and the $2^n$ power states may be related to power values which differ from each other by a predetermined threshold value or more.

Figure 10:
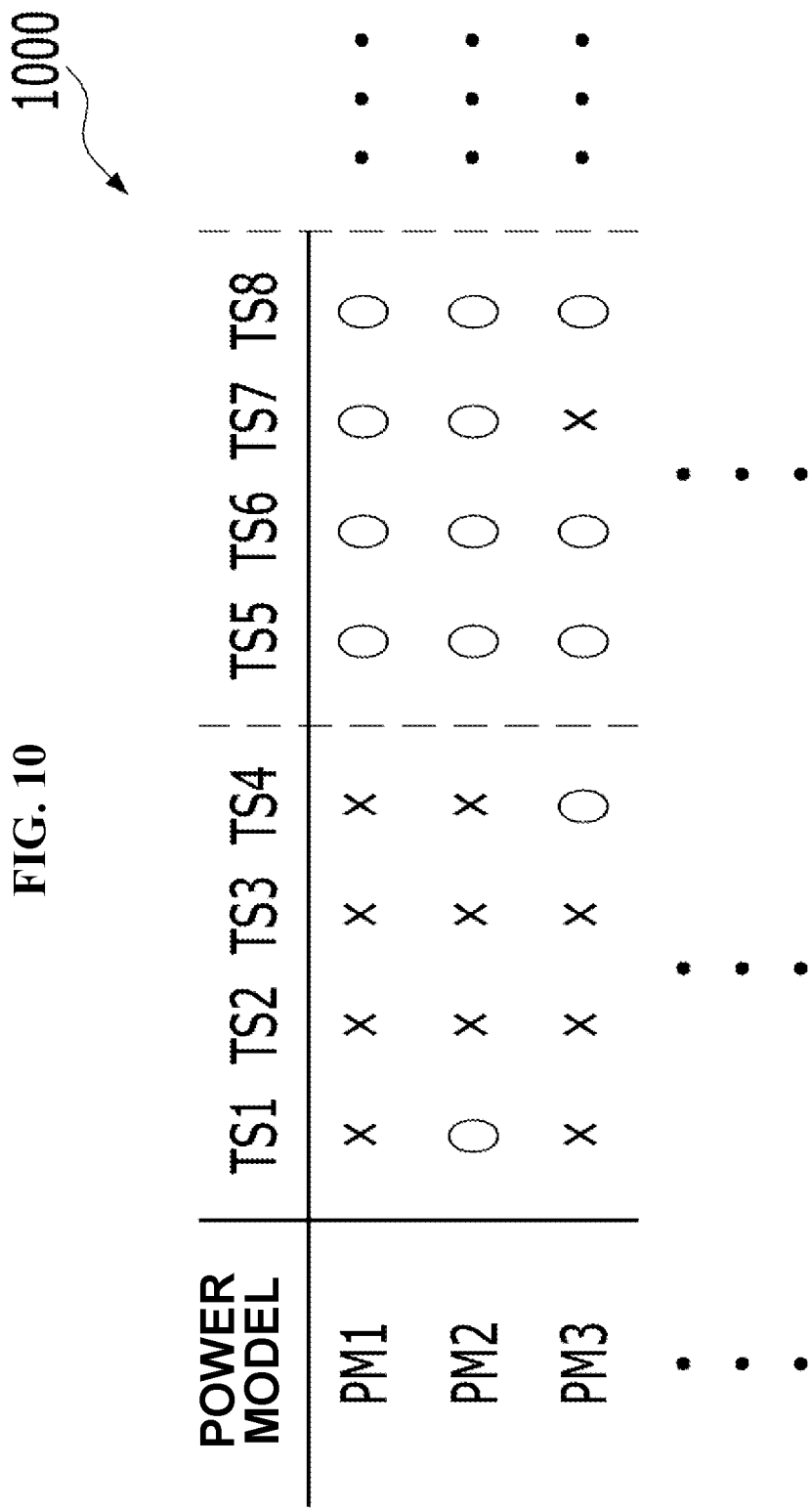
FIG. 10 is a diagram illustrating an example of identifying power states which are not defined by a plurality of power models and a time slot by inputting a test scenario to the power models according to the exemplary embodiment of the present disclosure.

FIG. 10 is a diagram illustrating an example of identifying power states which are not defined by a plurality of power models and a time slot by inputting a test scenario to the power models according to the exemplary embodiment of the present disclosure. The processor may simultaneously perform power analysis or update on a plurality of power models. For example, a power model for a target circuit may include a plurality of sub-power models, which may be power models for a plurality of module circuits included in the target circuit. In this case, the processor may analyze not only a total power consumption value of the power model for the target circuit but also power consumption values of each of the sub-power models. The processor may receive a test scenario and estimate a power consumption value. On the basis of each of the plurality of power models, the processor may identify time slots related to a power state for which a power value is not defined among a plurality of time slots included in the test scenario.

As shown in a table 1000, the processor may estimate power consumption values of a plurality of power models PM1, PM2, PM3, . . . for a received test scenario including a plurality of time slots TS1, TS2, TS3, TS4, TS5, TS6, TS7, TS8, . . . . In the table 1000, the mark "x" may represent a time slot related to a power state for which a power value is not defined by a power model, and the mark "O" may represent a time slot related to a power state for which a power value is defined by a power model. To efficiently update a plurality of power models, the processor may extract a time slot section corresponding to columns with the many marks "x." For example, the processor may determine that there are more time slots related to a power state (the mark "x") for which a power value is not defined by a power model in a section from $TS_1$ to $TS_4$ than in a section from $TS_5$ to $TS_8$ and extract the section from $TS_1$ to $TS_4$.

Subsequently, the processor may perform a gate-level simulation on time slots included in the extracted time slot section (e.g., the section from $TS_1$ to $TS_4$) to determine power values for power states related to each of the time slots. Subsequently, the processor may update the power models using pairs of the power states and the determined power values.

According to various exemplary embodiments of the present disclosure, it is possible to automatically generate a high-level power model only with user circuit information, and the power model generation speed is higher than that of an existing high-level power model. Also, since it is possible to generate a power model only including major input signals which greatly affect power consumption, the number of input signals used in the power model is about 1% of an existing power model which is very small.

According to various exemplary embodiments of the present disclosure, it is possible to generate a power model which is more than one hundred times faster than an existing power model while having 90% accuracy or more compared to the existing power model. In other words, it is possible to reduce a user's power analysis time by one hundred times or more, and a power analysis task which takes about three months according to the related art can be completed in one day.

According to various exemplary embodiments of the present disclosure, it is possible to provide not only an average power consumption value but also a power consumption value according to time. It is possible to analyze power consumption according to an input and state of a circuit.

According to various exemplary embodiments of the present disclosure, a main section in which a power model is of low quality can be extracted from a power analysis scenario (or a test scenario). In other words, it is possible to extract a section required for a power model update from a plurality of time slots included in the power analysis scenario and update the power model.

According to various exemplary embodiments of the present disclosure, with each update, the accuracy of a power model can be continuously increased, and the regeneration time can be reduced due to reuse of the power model. Accordingly, a user can conduct accurate power analysis of various scenarios at high speed, and the power analysis results can be used in optimizing a system structure in consideration of power consumption and the like.

According to various exemplary embodiments of the present disclosure, it is possible to increase power model generation speed, power analysis speed, and/or the accuracy of a power model, and the usability can be improved.

Effects of the present disclosure are not limited to those described above, and other effects which have not been described above will be clearly understood by those of ordinary skill in the art from the claims.

The above-described method of updating a power model may be provided as a computer program which is stored in a computer-readable recording medium to perform the method on a computer. The medium may continuously store a computer-executable program or temporarily store the computer-executable program for execution or downloading. Also, the medium may be various recording means or storage means in the form of a single piece of hardware or a combination of several pieces of hardware. The medium is not limited to a medium directly connected to a specific computer system and may be distributed over a network. Examples of the medium may include a medium configured to store a program instruction, including a magnetic medium, such as a hard disk, a floppy disk, or magnetic tape, an optical recording medium, such as a CD-ROM or a DVD, a magneto-optical medium, such as a floptical disk, a ROM, a RAM, a flash memory, or the like. Further, another example of the medium may include a recording medium or a storage medium managed by an app store for distributing applications or a website, a server, etc. for supplying or distributing various pieces of software.

The methods, operations, or techniques of the present disclosure may be implemented by various means. For example, these techniques may be implemented in hardware, firmware, software, or a combination thereof. Those of ordinary skill in the art will further appreciate that various illustrative logic blocks, modules, circuits, and algorithm steps described in connection with the disclosure herein may be implemented in electronic hardware, computer software, or a combination thereof. To clearly describe this interchangeability of hardware and software, various illustrative elements, blocks, modules, circuits, and steps have been generally described above in terms of functionality thereof. Whether such a function is implemented as hardware or software varies depending on design constraints imposed on the particular application and the overall system. Those of ordinary skill in the art may implement the described functions in various ways for each particular application, but such implementation should not be interpreted as causing a departure from the scope of the present disclosure.

In a hardware implementation, processing units used to perform the techniques may be implemented in one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described herein, a computer, or a combination thereof.

Therefore, various illustrative logic blocks, modules, and circuits described in connection with the present disclosure may be implemented or performed with general-purpose processors, DSPs, ASICs, FPGAs or other programmable logic devices, discrete gate or transistor logic, discrete hardware components, or any combination of those designed to perform the functions described herein. A general-purpose processor may be a microprocessor, but as an alternative, the processor may be any existing processor, controller, microcontroller, or state machine. The processor may also be implemented as a combination of computing devices, for example, a DSP and a microprocessor, a plurality of microprocessors, one or more microprocessors associated with a DSP core, or any other combination of such elements.

In a firmware and/or software implementation, the techniques may be implemented with instructions stored in a computer readable medium such as a RAM, a ROM, a non-volatile RAM (NVRAM), a programmable ROM (PROM), an erasable PROM (EPROM), an electrically erasable PROM (EEPROM), a flash memory, a CD, or a magnetic or optical data storage device. The instructions may be executable by one or more processors and may cause the processor(s) to perform certain aspects of the functions described in the present disclosure.

Although the above exemplary embodiments have been described as utilizing aspects of the presently disclosed subject matter in the context of one or more standalone computer systems, the subject matter is not limited thereto and may be implemented in conjunction with any computing environment such as a network or distributed computing environment. Further, aspects of the subject matter in the present disclosure may be implemented in or across a plurality of processing chips or devices, and storage may be similarly influenced across a plurality of devices. Such devices may include PCs, network servers, and handheld devices.

Although the present disclosure has been described in connection with some embodiments herein, various modifications and changes can be made without departing from the scope of the present disclosure which can be understood by those of ordinary skill in the art. Also, such modifications and changes should be considered falling within the scope of the claims appended herein.

What is claimed is:

1. A method of updating a register transfer level (RTL) power model for power consumption analysis of a semiconductor circuit by at least one processor, the method comprising:
    receiving a test scenario including a plurality of time slots, each of which is related to one power state;
    inputting the test scenario to an initial power model and identifying a first set of time slots related to a power state which is not defined by the initial power model among the plurality of time slots;
    determining a power value for a specific power state related to a second set of time slots which is a subset of the first set of time slots through a gate-level simulation of the semiconductor circuit; and
    updating the initial power model on the basis of the specific power state and the determined power value,
    wherein the inputting of the test scenario to the initial power model and the identifying of the first set of time slots related to the power state which is not defined by the initial power model among the plurality of time slots comprises:
        identifying a specific time slot section including a predetermined ratio of time slots or more related to the power state not defined by the initial power model among the plurality of time slots; and
        identifying the time slots related to the power state not defined by the initial power model among time slots in the specific time slot section as the first set of time slots.

2. The method of claim 1, further comprising:
    receiving a training vector including a plurality of power states and power values for the plurality of power states; and
    generating the initial power model on the basis of the training vector.

3. The method of claim 1, wherein the determining of the power value for the specific power state related to the second set of time slots which is the subset of the first set of time slots comprises:
    determining a power value in each of the second set of time slots through a gate-level simulation of the semiconductor circuit; and
    determining an average of the power values in the second set of time slots as the power value for the specific power state.

4. The method of claim 1, wherein, when the semiconductor circuit has n (n is a natural number) major input signals, $2^n$ power states are related to the semiconductor circuit, and
    the $2^n$ power states are related to power values which differ from each other by a predetermined threshold value or more.

5. The method of claim 1, wherein the determining of the power value for the specific power state related to the second set of time slots which is the subset of the first set of time slots comprises:
    determining a power value in each of the second set of time slots by performing the gate-level simulation of the semiconductor circuit for the specific time slot section; and
    determining an average of the power values in the second set of time slots as the power value for the specific power state.

6. A non-transitory computer-readable storage medium storing instructions that, when executed by a processor, cause the processor to perform the method of claim 1.

7. A device comprising:
    a memory; and
    at least one processor connected to the memory and configured to execute at least one computer-readable program included in the memory,
    wherein the at least one program includes instructions for:
    receiving a test scenario including a plurality of time slots, each of which is related to one power state;
    inputting the test scenario to an initial power model and identifying a first set of time slots related to a power state which is not defined by the initial power model among the plurality of time slots;
    determining a power value for a specific power state related to a second set of time slots which is a subset of the first set of time slots through a gate-level simulation of a semiconductor circuit; and
    updating the initial power model on the basis of the specific power state and the determined power value,
    wherein the inputting of the test scenario to the initial power model and the identifying of the first set of time slots related to the power state which is not defined by the initial power model among the plurality of time slots comprises:
    identifying a specific time slot section including a predetermined ratio of time slots or more related to the power state not defined by the initial power model among the plurality of time slots; and identifying the time slots related to the power state not defined by the initial power model among time slots in the specific time slot section as the first set of time slots.

* * * * *